Feb. 3, 1931. C. B. BROWN Re. 17,944
CULTIVATOR
Original Filed Oct. 9, 1925 4 Sheets-Sheet 1
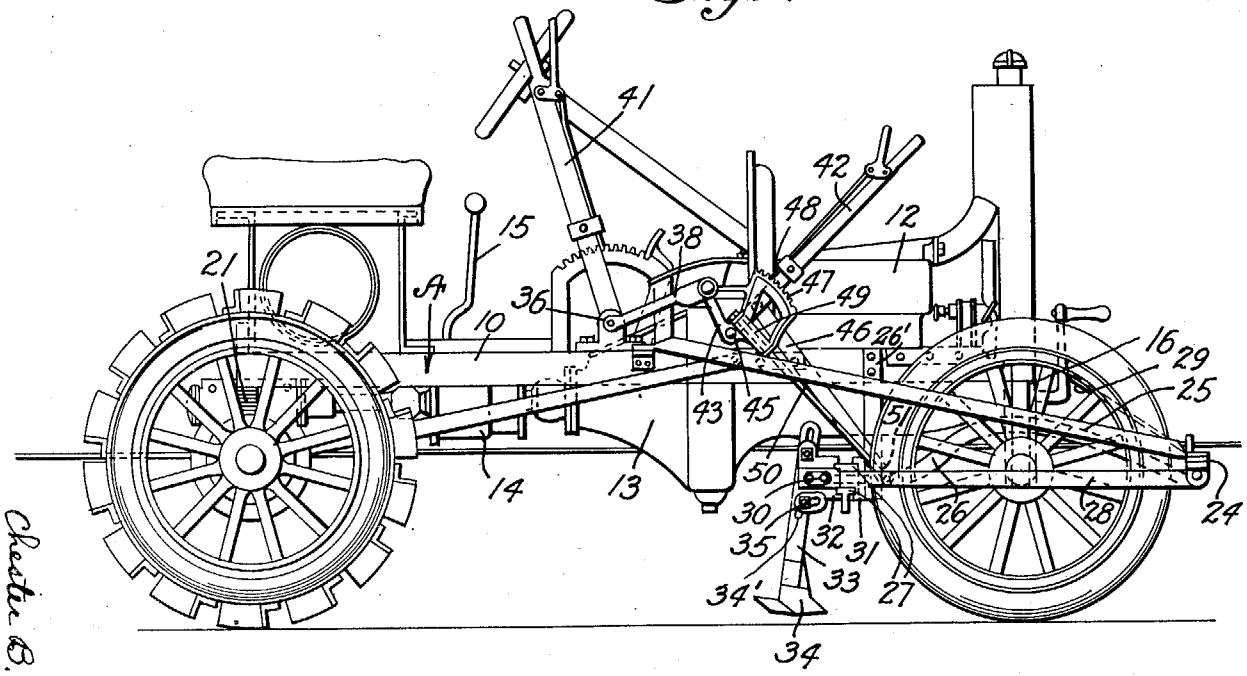
Inventor
Chester B. Brown
By
Rolland S. Trott Attorney Feb. 3, 1931. C. B. BROWN Re. 17,944
CULTIVATOR
Original Filed Oct. 9, 1925 4 Sheets-Sheet 2
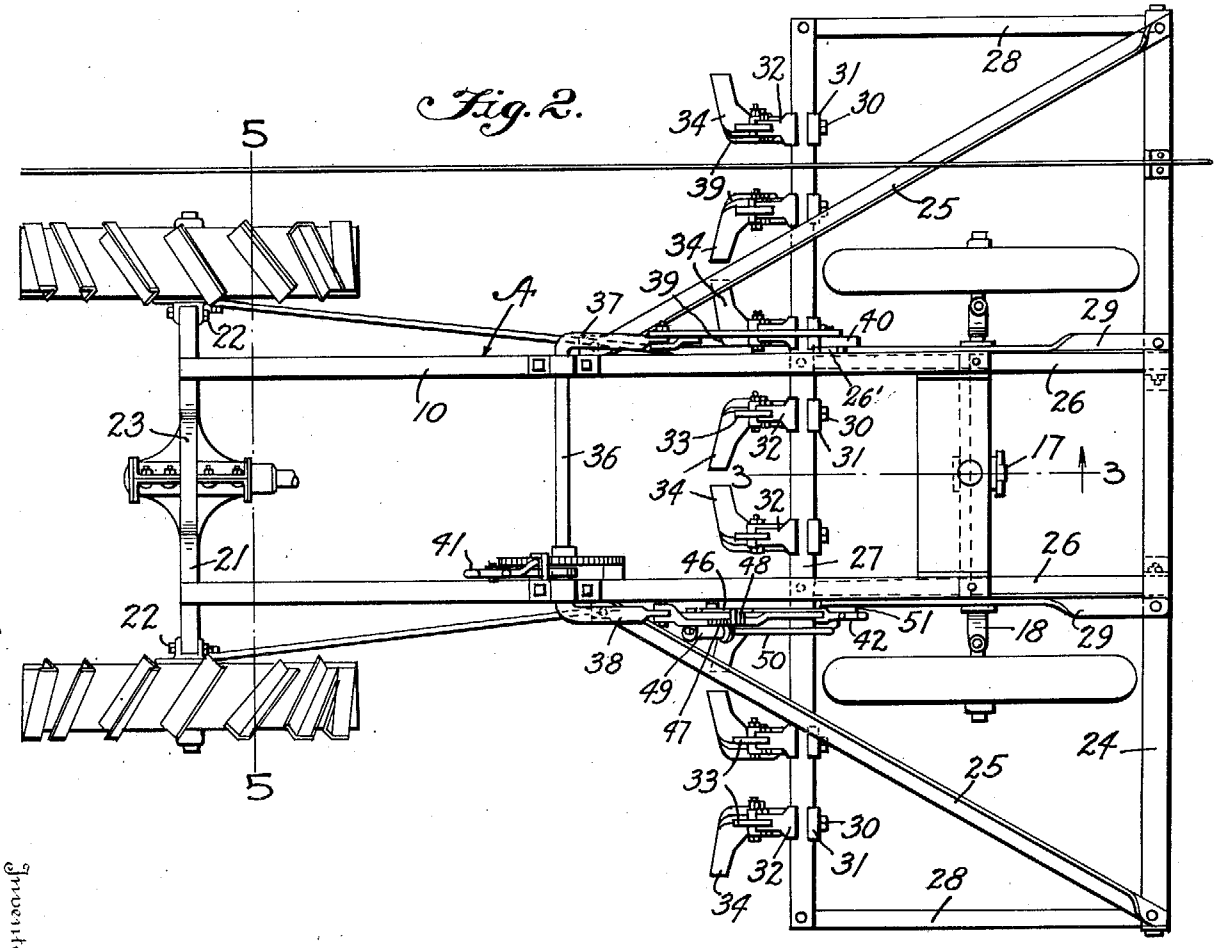
Inventor
Chester B. Brown
By
Rolland S. Trott Attorney Feb. 3, 1931. C. B. BROWN Re. 17,944

CULTIVATOR

Original Filed Oct. 9, 1925 4 Sheets-Sheet 3

Inventor

Chester B. Brown

By

Rolland S. Trott Attorney

Feb. 3, 1931. C. B. BROWN Re. 17,944
CULTIVATOR
Original Filed Oct. 9, 1925 4 Sheets-Sheet 4
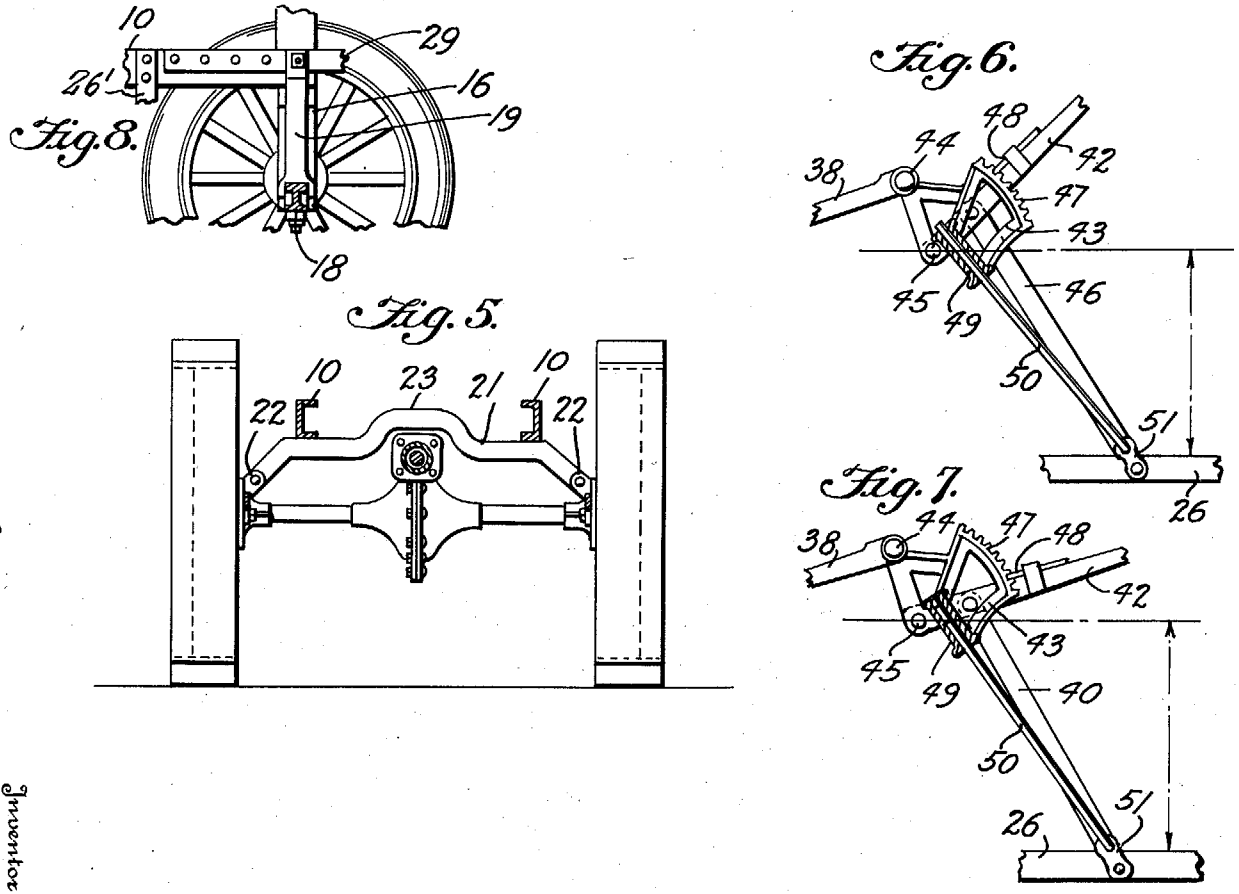
Inventor
Chester B. Brown
By
Rollard S. Trott Attorney Reissued Feb. 3, 1931 Re. 17,944

UNITED STATES PATENT OFFICE

CHESTER B. BROWN, OF MORRILL, NEBRASKA

CULTIVATOR

Original No. 1,601,674, dated September 28, 1926, Serial No. 61,545, filed October 9, 1925. Application for reissue filed July 23, 1927. Serial No. 208,010.

This invention comprehends the provision of a motor operated cultivator or the like, designed to be used with any of the standard cultivating tools, and to accomplish the desired work more accurately and with a minimum of time and effort.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:—

Figure 1 is a side elevation of the machine constructed in accordance with the present invention.

Figure 2 is a plan view of the running gear of the machine and showing how the auxiliary frame is supported by the main frame of the machine.

Figure 5 is a rear elevation.

Figure 6 is a detail view of the means employed for adjusting the auxiliary frame and showing one position of parts.

Figure 7 is a similar view showing another position of the parts.

Figure 8 is a fragmentary view partly in section showing the manner of bracing and supporting the frame of the machine from the front axle thereof.

Figure 4:
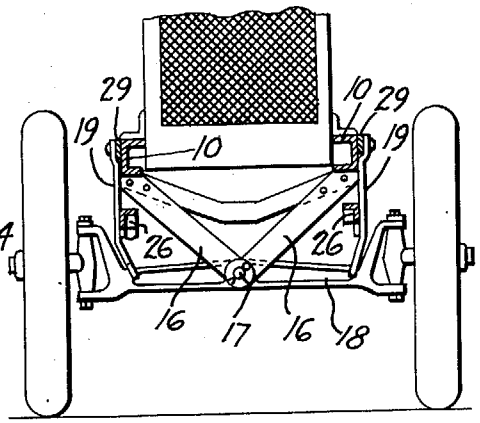
Figure 4 is a fragmentary front elevation of the machine.

Referring to the drawings in detail, A indicates generally the running gear of a motor operated vehicle, and wherein 10 represents the frame thereof.

A motor of the Ford type is employed and indicated at 12, and this motor consequently includes a planetary transmission indicated at 13. Arranged directly behind this transmission and operatively connected with the drive shaft of the machine is a sliding transmission 14 including the control lever 15, which is employed for the reduction of speed as the occasion may require.

At the front end of the machine the frame 10 is braced by members 16 arranged in divergent relation, and adjacent the transverse end member of the main frame, as illustrated. The members 16 are connected with a bolt 17 passed through the front axle 18 of the machine, and when it is desired to hold the body of the machine from movement with relation to the axle I employ side braces 19 adapted to be secured to the opposed sides of the frame 10, and designed to straddle and repose upon the front axle 18.

The rear end of the frame 10 is braced by a transverse member 21 upon which the frame 10 reposes, the member 21 being connected with the spring perches 22 in place of the usual transverse spring, and arched as at 23 to pass over the differential.

Carried by and suspended from the main frame of the machine is an auxiliary frame clearly shown in Figures 1 and 2, and which auxiliary frame is rectangular in plan and of a size to project an appreciable distance beyond both sides of the machine, as shown.

This auxiliary frame includes a front bar 24 arranged in advance of the front wheels of the machine and transversely thereof, and which bar is braced and supported by diagonally spaced bracing members 25 which have their corresponding rear extremities suitably secured to the sides of the main frame, while their forward extremities are secured to the front bar 24 at the ends thereof.

Figure 3:
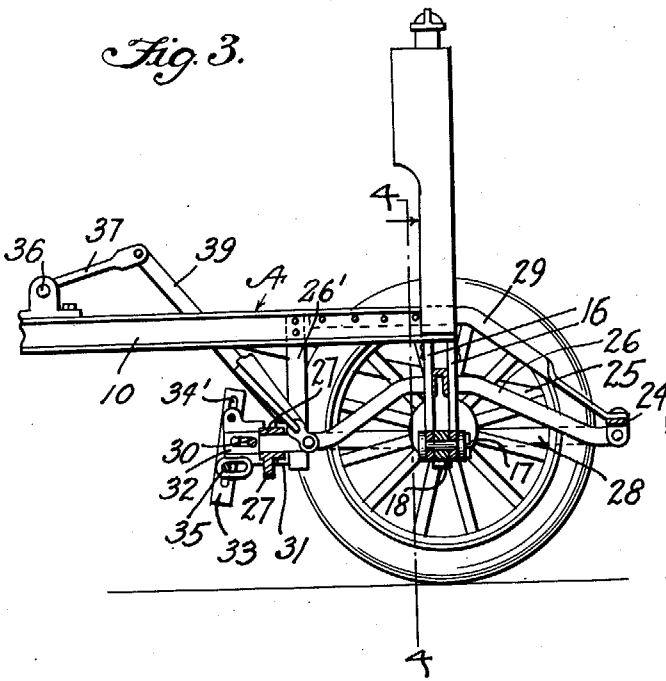
Figure 3 is a sectional view on the line 3—3 of Figure 2.

This front bar is further supported and braced by spaced parallel bracing members 26 which are suitably arched as shown in Figure 3 to pass over the front axle, the corresponding rear extremities of these members being secured to the rear or adjacent bar 27 of the auxiliary frame, while their corresponding forward extremities are pivotally connected with the front bar 24. These members are also pivotally connected with the bar 27 as are also the spaced parallel members 28 of the frame, which have their forward extremities pivotally connected with the front bar 24. Again, the front bar 24 of the frame is braced and supported by spaced members 29 which are of angular contour to be secured to the sides of the main frame 10 from which they project forwardly and at an inclination to the front bar 24 with which they are secured.

The guide bars 26′ are securely attached to the frame 10 (see Figures 1, 2, 3 and 8) and have working clearance with the bar 27 and act by contact with the members 26 to prevent lateral movements of the bar 27, while still permitting it to rise and fall. When the braces 19 are used they act to assist the guide bars 26′ in this function, though, due to their considerable distance from the bar 27 and the flexibility thus introduced, this is of slight importance. The braces 19 are used, however, only under some conditions, and for the purpose of preventing tools which tend to dig into the ground, from rocking the machine when used in hard ground. But, as they prevent pivotal action of the frame on the front axle they are never used when this can be avoided.

This construction and arrangement of parts not only supports the auxiliary frame upon the main frame of the machine, but allows the auxiliary frame to be raised or lowered with relation to the ground to properly position the cultivator tools for the work to be accomplished, and also allows the auxiliary frame to be tilted endwise when the machine is moving over inclined or hilly territory.

The rear bar 27 includes spaced upper and lower sections, as clearly shown in Figure 1, and between these sections are passed bolts 30 which are utilized to hold the cooperating parts 31 and 32, respectively, of a clamp associated with said bar, these clamps being used in conjunction with the shanks 33 of the cultivator tools indicated at 34.

The shank 33 of each tool is provided with slots 34′ so that the said tools are susceptible of vertical adjustment with relation to the adjacent bar 27 of the auxiliary frame, and also susceptible of tilting adjustment by reason of the slot and pin connection, indicated at 35.

In addition to these adjustments of the cultivating tools the latter may be also slid along the bar 27 so as to space the tools any desired distance apart, and to accomplish this it is only necessary to loosen the bolts 30 to slide the latter between the sections of the transverse bar 27, as will be readily understood.

For the purpose of adjusting the auxiliary frame, I employ a shaft 36 journaled transversely of the frame 10 and having crank arms 37 and 38 at the ends thereof. The crank arm 37 is pivotally connected with the adjacent end of a link 39, while the lower end of this link is pivotally connected with a link 40 associated with the adjacent arch-shaped bracing member 26, as clearly shown in Figure 3.

The other crank arm 38 is also connected with the adjacent arch-shaped bracing member 26, but indirectly so through a construction of means to be presently described, which allows the frame in its entirety to be raised and lowered with relation to the ground incident to the operation of the lever 41, and independently operated by means of a lever 42, when it is desired to only raise one end of the frame. This connecting means includes a frame 43 which is pivotally connected as at 44 with the crank arm 38. Pivotally mounted on this frame 43, as at 45, is the lever 42 above referred to, the lever 41 being carried by the shaft 36.

A link 46 is pivotally connected with the lever 42 adjacent its lower end, and provides a connection between this lever and the adjacent arch-shaped bracing member 26 of the auxiliary frame.

The frame 43 is provided with a rack bar 47 with which a pawl 48 cooperates to hold the lever 42 in a given position. The frame 43 is also formed with a sleeve 49 which slidably receives a guide rod 50, the lower end of the latter being connected with the same link 51 that provides a connection between the link 46 and the adjacent bracing member 26.

It is by reason of this construction and arrangement of the rod 50 that the connecting means between the crank arm 38 and the auxiliary frame is afforded the proper rigidity to maintain the parts in working relation incident to the operation of either of the levers 41 and 42, respectively.

When it is desired to raise and lower the auxiliary frame in its entirety from the front bar 24, the lever 41 is utilized, and when this lever is operated the frame 43 and its associated parts all move as a unit under the influence of the lever 41. However, when it is desired to raise or lower one end of the auxiliary frame independently of the other end thereof, the lever 42 is employed, which allows the frame 43 to be swung upon its pivotal connection 44 to so adjust the auxiliary frame independently of the lever 41, as will be readily understood. The levers 41 and 42 are arranged within convenient reach of the operator and can be very easily manipulated for the purposes intended.

While it is believed that from the foregoing description the nature and advantages of the invention will be readily apparent, I desire to have it understood that I do not limit myself to what is herein shown and described, and that such changes may be resorted to when desired as fall within the scope of what is claimed.

Having thus described the invention, what is claimed as new, is:—

1. In a motor driven cultivator adapted to be steered by its front wheels and provided with a frame, a tool bar provided with tools, lever actuated means for raising or lowering the tool bar, and means including guiding bars depending from and attached to the frame and radius bars pivotally connected at their forward ends with the frame and attached at their rear ends to the tool bar, adapted to position the tool bar close to the rear of the front wheels whereby the tools may move in a substantially vertical plane and will closely follow the movements of the front wheels in steering.

2. In a motor driven cultivator adapted to be steered by its front wheels and provided with a frame having a transverse laterally braced draw bar forward of the front wheels, a tool bar provided with tools, lever actuated means for raising and lowering the tool bar, and means including guiding bars depending from and attached to the frame and radius bars pivotally connected at their front ends with the draw bar and attached at their rear ends to the tool bar, adapted to position the tool bar close to the rear of the front wheels whereby the tools may move in a substantially vertical plane and will closely follow the movements of the front wheels in steering.

3. In a motor driven cultivator adapted to be steered by its front wheels and provided with a frame having a transverse laterally braced draw bar forward of the front wheels, a tool bar, tools, clamping means adapted to mount the tools on the tool bar and providing adjustment of the tools with respect to the tool bar, lever actuated means for raising or lowering the tool bar, and means including guiding bars depending from and attached to the frame and radius bars pivotally connected at the front ends to the draw bar and attached at their rear ends to the tool bar, adapted to position the tool bar close to the rear of the front wheels whereby the tools may move in a substantially vertical plane and will closely follow the movements of the front wheels in steering.

4. In a motor driven cultivator provided with a frame and adapted to be steered by its front wheels, a tool bar, tools, means to clamp the tools upon the tool bar and providing adjustment of the tools with respect to the tool bar, lever actuated means for raising and lowering the tool bar, and means including guiding means depending from and attached to the frame and radius bars attached to the tool bar and in front thereof and pivotally connected to the frame adapted to position the tool bar close to the rear of the front wheels whereby the tools may move in a substantially vertical plane and will closely follow the movements of the front wheels in steering.

5. In a motor driven cultivator provided with a frame and adapted to be steered by its front wheels, a tool bar, tools, means to clamp the tools upon the tool bar and providing vertical, lateral and fore and aft angular adjustment of the tools with respect to the tool bar, lever actuated means for raising and lowering the tool bar, lever actuated means for tilting one end of the tool bar with respect to the other, and means including guiding means depending from and attached to the frame an radius bars in front of the tool bar and connected to both the tool bar and frame adapted to permit vertical movement of the tool bar with respect to the frame and to position the tool bar close to the rear of the front wheels whereby the tools may have guided movement in a substantially vertical plane and will closely follow the steering movements of the front wheels.

6. In a motor driven cultivator provided with a frame and adapted to be steered by its front wheels, a tool bar, tools mounted thereon, lever actuated means for raising and lowering the tool bar including two links, lever actuated means included in one of said links for altering its length and correspondingly adjusting one end of the tool bar and thereby moving one end of the tool bar independently of the other, guide bars depending from the frame, and radius bars in front of the tool bar, including radius bars guided by the guide bars, and pivotally connected to the frame and attached to the tool bar and adapted to position the tool bar close to the rear of the front wheels whereby the tool bar is guided to move in a substantially vertical plane and will closely follow the movements of the front wheels in steering.

7. In a motor driven cultivator adapted to be steered by its front wheels, and provided with a frame having a transverse draw bar in front of the front wheels, a tool bar, tools mounted thereon, lever actuated means for raising and lowering the tool bar including two links, lever actuated means included in one of said links for altering its length and correspondingly adjusting one end of the tool bar and thereby moving one end of the tool bar independently of the other, radius bars in front of the tool bar and attached thereto and pivotally connected with the draw bar and adapted to position the tool bar close to the rear of the front wheels, and guide bars mounted on the frame and adapted to guide the raising and lowering movements of the radius bars and tool bar whereby the tool bar is guided to move in a substantially vertical plane and will closely follow the steering movements of the front wheels regardless of its vertical movements.

8. In a motor driven cultivator adapted to be steered by its front wheels and provided with a frame, a tool bar provided with tools, lever actuated means for raising and lowering the tool bar, and means including radius bars pivotally connected at their forward ends with the frame and attached at their rear ends to the tool bar and adapted to position the tool bar close to the rear of the front wheels, and guide bars mounted on the frame and adapted to maintain the alignment of the tool bar in its up and down movements, and to cause the tool bar to closely follow the steering movements of the front wheels.

9. In a motor driven cultivator provided with a frame and adapted to be steered by its front wheels, a tool bar, tools mounted thereon, lever actuated means for raising and lowering the tool bar including two links, lever actuated means included in one of said links for altering its length and correspondingly adjusting one end of the tool bar thereby moving one end of the tool bar independently of the other, radius bars in front of the tool bar and attached thereto and pivotally connected with the frame and adapted to position the tool bar close to the rear of the front wheels, and guide bars mounted on the frame and adapted to align the tool and radius bars while permitting their raising and lowering movements and acting with the radius bars to cause the tool bar to closely follow the steering movements of the front wheels.

10. In a motor driven cultivator adapted to be steered by its front wheels and provided with a frame, a tool bar, tools, clamping means adapted to mount the tools on the tool bar and providing adjustment of the tools with respect to the tool bar, lever actuated means for raising or lowering the tool bar, lever actuated means for raising or lowering one end of the tool bar independently of the other and means connecting the tool bar to the frame and permitting its movement in a substantially vertical plane and otherwise adapted to move the tool bar as a unit with the frame adjacent the rear of the front wheels whereby the tool bar will closely follow their steering movements.

11. In a motor driven cultivator adapted to be steered by its front wheels and provided with a frame, a tool bar provided with tools positioned adjacent said wheels, means connecting the tool bar to the frame and permitting its vertical adjustment with respect thereto, and means attached to the frame and adapted to co-operate with said first means to maintain the lateral position of the tool bar with respect to the frame, while permitting said adjustment.

In testimony whereof I affix my signature.

CHESTER B. BROWN.